(12) United States Patent
Zandhuisen

(10) Patent No.: US 12,650,332 B2
(45) Date of Patent: Jun. 9, 2026

(54) SYSTEMS AND METHODS FOR CALIBRATING A SCALE OF A DATA READER

(71) Applicant: Datalogic IP Tech S.r.l., Lippo di Calderara di Reno (IT)

(72) Inventor: Aric Zandhuisen, Eugene, OR (US)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 349 days.

(21) Appl. No.: 18/395,088

(22) Filed: Dec. 22, 2023

(65) Prior Publication Data

US 2025/0207971 A1 Jun. 26, 2025

(51) Int. Cl.
*G01G 23/01* (2006.01)
*G01G 23/35* (2006.01)

(52) U.S. Cl.
CPC ............. *G01G 23/01* (2013.01); *G01G 23/35* (2013.01)

(58) Field of Classification Search
CPC ..... G01G 19/4144; G01G 23/01; G01G 23/35
See application file for complete search history.

(56) References Cited

U.S. PATENT DOCUMENTS 4,751,661 A * 6/1988 Amacher ............... G01G 23/01
73/1.13
5,139,100 A * 8/1992 Brauneis .............. G07G 1/0054
235/383

5,987,428 A * 11/1999 Walter ................... G06Q 20/20
705/16
6,085,979 A * 7/2000 Maddox .............. G07G 1/0045
235/383
8,136,727 B2 * 3/2012 Rollyson ............. G06Q 20/208
705/28
8,430,318 B2 4/2013 Mcqueen et al.
9,004,359 B2 4/2015 Shearin et al.
9,305,198 B2 4/2016 Thompson et al.
10,049,247 B2 8/2018 Gao
10,248,896 B2 4/2019 Gao et al.
10,970,502 B2 4/2021 Canini et al.
2011/0132985 A1 * 6/2011 McQueen ................. G01J 1/44
250/206
2011/0172943 A1 * 7/2011 Roberts ................ G01G 23/166
702/87
2013/0056285 A1 * 3/2013 Meagher ................ G01G 23/02
177/1
2023/0206205 A1 6/2023 Howard et al.
2025/0378431 A1 * 12/2025 Handshaw ........... G01G 19/413

* cited by examiner

*Primary Examiner* — Natalie Huls
(74) *Attorney, Agent, or Firm* — Stoel Rives LLP

(57) ABSTRACT

The disclosure relates to a data reading system and related methods of operation designed for efficiently calibrating a scale associated with the data reading system. Prior to powering the scale, the data reading system initially determines whether an item is present on the scale via images obtained by one or more data readers of the data reading system. Upon confirmation that the scale is clear of any items that may impact an initial zero weight, the data reading system powers on the scale to complete the initialization process and configure the data reading system for operation.

20 Claims, 3 Drawing Sheets

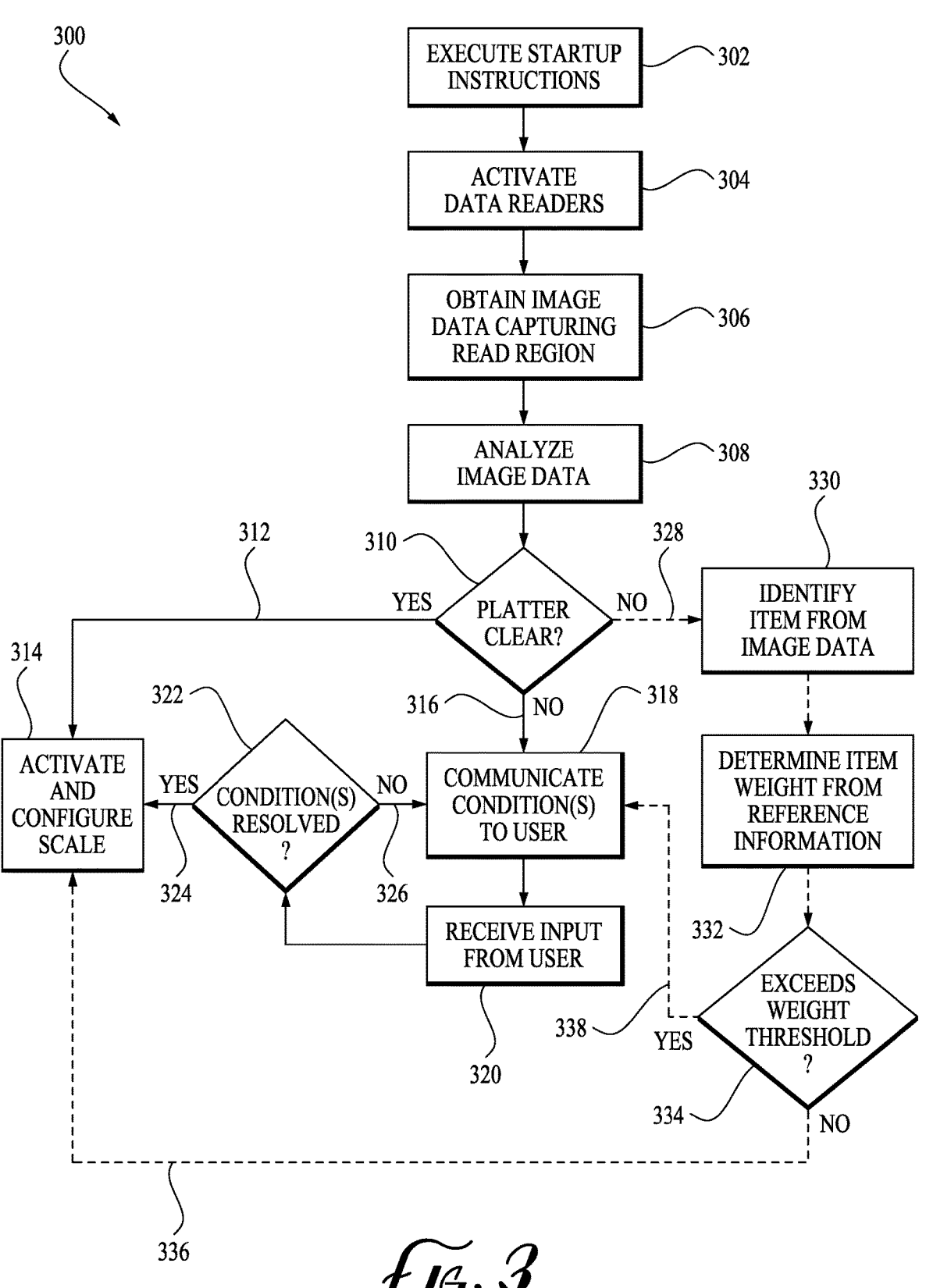

*300*

302 — EXECUTE STARTUP INSTRUCTIONS

304 — ACTIVATE DATA READERS

306 — OBTAIN IMAGE DATA CAPTURING READ REGION

308 — ANALYZE IMAGE DATA

312 / 310 / 328

310 — PLATTER CLEAR?

YES

314 — ACTIVATE AND CONFIGURE SCALE

322 / 324 — CONDITION(S) RESOLVED?

326 — NO

318 / 316 — COMMUNICATE CONDITION(S) TO USER

NO

328 — NO

330 — IDENTIFY ITEM FROM IMAGE DATA

DETERMINE ITEM WEIGHT FROM REFERENCE INFORMATION — 332

RECEIVE INPUT FROM USER

320

338 — YES

334 — EXCEEDS WEIGHT THRESHOLD? — NO

SYSTEMS AND METHODS FOR CALIBRATING A SCALE OF A DATA READER

BACKGROUND

The present disclosure relates generally to data reading systems in a retail setting, and more particularly, to such systems and related methods for efficiently calibrating a scale during the initialization process of the data reading system.

Data reading systems in general are used in a variety of settings for reading optical codes, capturing images of items, and/or acquiring data. In a retail environment, data reading devices are well known for reading UPC and other types of optical codes (e.g., barcodes) on grocery items or packages to identify and add the item to a customer's transaction list for purchasing during a checkout process. Some data reading systems are equipped with integrated scales to provide a space-efficient solution for both acquiring optical codes from items and for weighing other items that are sold by weight (such as produce and meat) as necessary to complete a transaction. The scales in these systems must be properly calibrated to set the scale to an accurate reference point (i.e., to zero the scale) and ensure that proper item weights are captured in a transaction. In a retail setting, obtaining an accurate weight for an item is important to ensure that item costs are determined properly for the customer and to avoid potential retail losses for the retailer due to improperly weighed items.

Moreover, in many conventional designs, the overall point-of-sale system may also include a secondary scale to weigh items placed in a bagging area. In these configurations, when an item is scanned or otherwise processed, the weight of the item as registered in the bagging area may be compared to the weight of the item obtained during the scanning process by the data reading system to ensure a match. If the item weights do not match (within an acceptable tolerance), the point-of-sale system may issue an alert and require reprocessing of the item. Accordingly, for these systems, properly calibrated scales for the data reading system (and the bagging area) are important both to ensure the overall accuracy of the transaction and to streamline the retail checkout process by avoiding or minimizing false alarms due to imprecise weight measurements obtained during the scanning process.

In conventional data reading systems, when the system is powered on, the various components (e.g., processor, data readers, illumination, scale, etc.) are also activated during a boot sequence. For the scale, once the load cell for the scale is powered on, the load cell immediately begins to register an initial zero weight. In some cases, such as when the data reading system is deployed at a checkstand or a counter, the data reading system may have items of significant weight (e.g., cash drawers, periodicals, newspapers, or other items) present on the scale during the boot process. In some cases, such items may have been placed on the scale prior to power-up, without the cashier recognizing the impact of the items relative to the scale calibration process. Accordingly, during the boot sequence the scale may record that heavy item weight as an initial zero weight, which can cause inaccuracies when the item is later removed from the scale and the data reading system is used during a typical checkout transaction.

Typically, scale subsystems may capture initial zero weights ranging between −2% and +18% of the total scanner maximum weight. To help calibrate the scale for a data reading system after startup, the zero setpoint of the scale may be reset by depressing or otherwise activating a zeroing button in communication with the scale. Typically, this calibration process is viable to accurately zero the scale if the item weight is relatively small (e.g., less than approximately 0.5 lbs. to 0.6 lbs. or thereabouts). If, however, the item weight is within the +18% weight limit but exceeds the calibration weight limit, the scale cannot be zeroed via the zeroing button and the data reading system must be entirely reset (with the item weight removed) to properly calibrate the scale.

Accordingly, the inventor has identified a need for an improved data reading system designed to efficiently calibrate the scale during the boot sequence while minimizing or avoiding the need to reset the data reading system when a heavy weight is present on the scale at startup. Additional aspects and advantages of such systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 3 is a flow chart illustrating a streamlined process for calibrating a scale of a data reading system in accordance with one embodiment.

DETAILED DESCRIPTION OF DISCLOSED EMBODIMENTS

Figure 1:
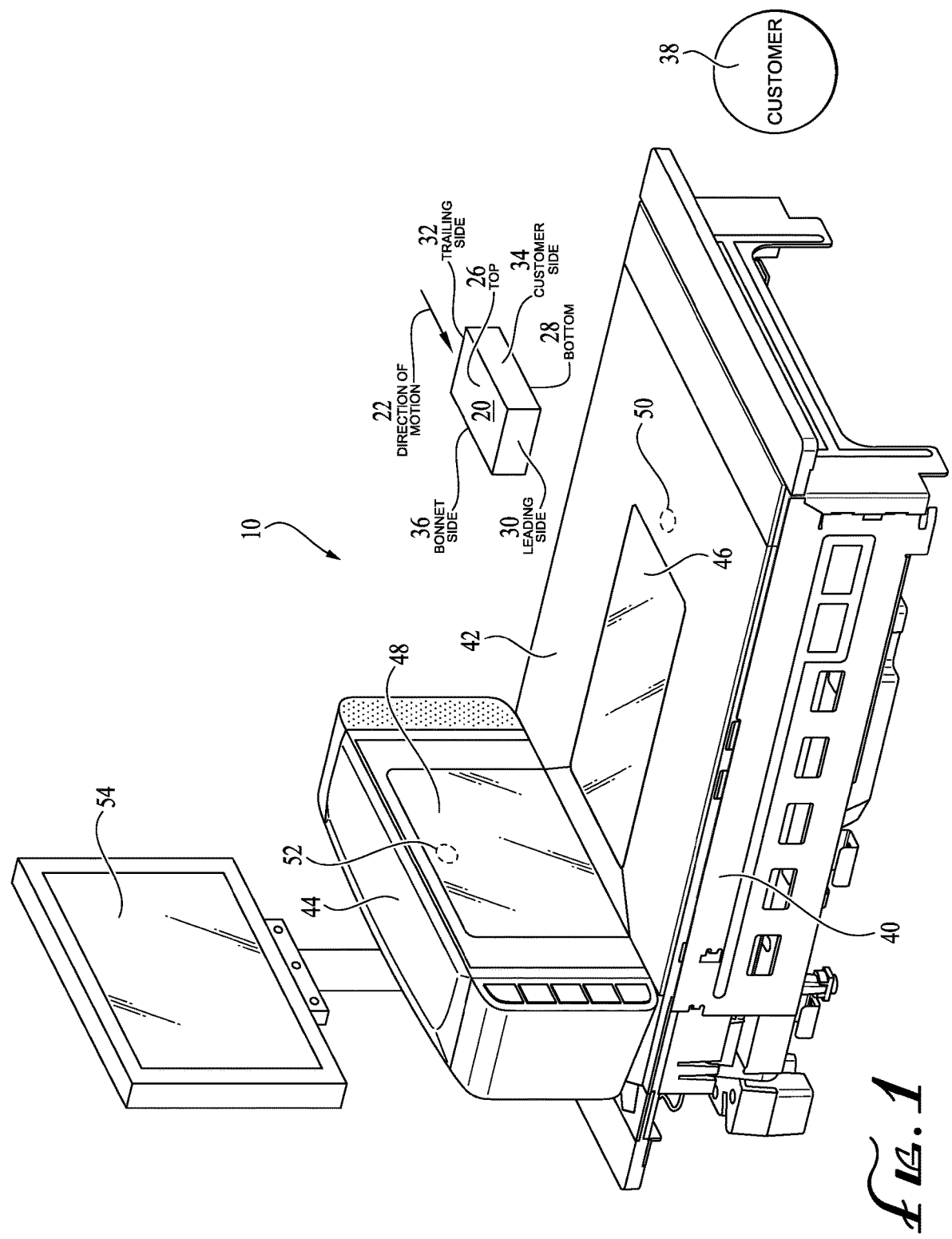
FIG. 1 illustrates a data reading system operable for scanning items and processing a purchase transaction in accordance with one embodiment.

With reference to the drawings, this section describes specific embodiments relating to a data reading system and its detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With collective reference to the figures, the following disclosure generally relates to a data reading system, such as a self-checkout system or other suitable point-of-sale system, that may be used in a retail setting to complete a customer transaction for the purchase of various goods offered in a retail facility. The data reading system may include any suitable data reading systems operable for capturing data from an item and any suitable reading engine configuration for decoding the captured data to complete the retail transaction.

As mentioned previously and further described in detail below, some data reading systems include a scale for weighing meat, produce, and other items sold by weight. However, one disadvantage of conventional data reading systems with a scale is that on occasion, the data reading system is initialized with a heavy weight resting on the scale. This weight may result in the scale registering a larger initial zero weight that cannot be properly calibrated with a zeroing button because the weight is outside the effective range of the zeroing button. Instead, the data reading system must be reset (after the weight is removed) to properly recalibrate the scale. The embodiments described herein with reference to the figures relate to an improved data reading system designed to streamline the scale calibration process and avoid having to reset the data reading system even if a large weight is initially present on the scale.

As further described in detail below, the improved data reading system may incorporate a predetermined boot sequence designed to delay power to the scale until the scale is clear of any items that may result in capturing a large initial zero weight. In some embodiments, the boot sequence may include initially powering one or more data readers operable to capture image data of the platter region and any item present on the scale. If an item is detected, then the data reading system may prompt the user to ensure the item is removed. Upon receiving confirmation that the item has been removed, the data reading system continues the boot sequence and proceeds to activate the scale. Without any items on the scale, any required zeroing after completion of the boot sequence should be well within the tolerance range for calibration via the zeroing button as needed. Accordingly, one advantage of the disclosed subject matter is that it avoids the need to reset the data reading system, even in the presence of heavy items resting against the scale at system startup. Additional details of these and other embodiments of the data reading system and related methods are further discussed below with reference to the accompanying figures.

"Image data" as used herein may include raw images as well as processed images (e.g., cropped, compressed, etc.) from the raw images as well as other forms of data derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers arranged at various positions within the housing of the data reading system, such as in a horizontal base unit or a vertical bonnet of a bi-optic data reader having imagers positioned in two different planes. Single plane scanners (e.g., horizontal or vertical only housings) are also contemplated and are within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems. In some cases, image data and images may be used interchangeably herein.

FIG. 1 illustrates an example embodiment of a data reading system 10 in accordance with one embodiment. The following section briefly describes general components of the data reading system 10 and provides an example operation of the data reading system 10 when used in a retail establishment to process a transaction. With reference to FIG. 1, the data reading system 10 is used to scan, weigh (as needed), and pay for items 20 as part of a customer transaction. In some embodiments, the data reading system 10 may be designed as a self-checkout system for processing transactions without the need for assistance by store clerk or other personnel. In other embodiments, the data reading system 10 may instead be incorporated into a checkout counter operated by a clerk. For discussion purposes, it should be understood that while the drawings and relevant discussion may reference the data reading system 10 as a self-checkout system, embodiments of the disclosure also include systems that may be operated by a store clerk in an assisted checkout lane environment. Thus, it should be understood that references to "customer" are also applicable to a "clerk" or "operator" who may be the user of the data reading system 10 in certain situations. In addition, the scope of the disclosure incorporates other configurations for data reading systems that incorporate a scale.

As illustrated in FIG. 1, the data reading system 10 is operable to obtain information (e.g., optical codes, images, etc.) from an example six-sided item 20 (e.g., a grocery item) that is passed along a direction of motion 22 through a read region of the data reading system 10. For general purposes of discussion, the item 20 is represented in the figures as a six-sided, box-shaped package having a top surface 26, a bottom surface 28, a leading side 30, a trailing side 32, a customer side 34, and a bonnet side 36. While the item 20 is illustrated and described as a box-shaped package for convenience, it should be understood that the item 20 may encompass other shapes, including, for example, round fruits or vegetables, cylindrical cans, irregularly shaped packages, such as a bag of potatoes, potato chips, or the like.

The data reading system 10 may be a two-plane or bioptic reader having a housing that includes a lower base section 40 supporting a platter 42, and a bonnet or raised upper section 44 extending from and protruding upwardly from the platter 42 (and the lower base section 40). The data reading system 10 further includes a scale 164 (see FIG. 2) disposed underneath the platter 42 and within the lower base section 40, where the scale 164 includes load cells or receptors operable to weigh the item 20 (such as for items sold by weight) when the item 20 rests against the top surface of the platter 42. In some embodiments, the scale 164 may be incorporated into or otherwise operable in conjunction with the platter 42.

The data reading system 10 includes one or more data readers 50 housed within lower base section 40 underneath the platter 42, and the bonnet 44 may further include one or more data readers 52 housed therein. The data readers 50, 52 are arranged within the platter 42 and bonnet 44, respectively, to project their fields-of-view through the respective windows 46, 48 to capture image or other suitable data for decoding an optical code on the item 20 as it moves through the combined read region of the data readers 50, 52 of the data reading system 10. In some embodiments, the data reading system 10 may incorporate mirrors or any other suitable optical components (not shown in FIG. 1) within the lower base section 40 and bonnet 44 to ensure the respective fields-of-view of the data readers 50, 52 are directed as needed to capture data from the item 20. In other embodiments, the data reading system may be a single plane reader without a bonnet or may have other suitable configurations, including having a top-down data reader (see 152 of FIG. 2) that includes a stand extending upwardly from the lower base section 40 and above the bonnet 44. The top-down data reader includes a head with one or more data readers therein arranged to project a field-of-view from an elevated position downwardly onto the platter 42.

For purposes of this disclosure, reference to a "data reader" is used in an expansive sense to describe any suitable device (or combination of devices) capable of obtaining image data and/or other suitable data from an item 20 in a field-of-view of the device. The captured data may thereafter be used for decoding coded information from an item 20 and/or for accomplishing any other suitable purpose related to the data reading system 10. In some embodiments, a data reader may include a camera or other suitable imaging system, a processor, a decoding unit, and a controller for communicating data to other data readers or external systems for processing. In other embodiments, the data reader may include a subset of these components within a common housing and other components may be external to the data reader itself. For example, in one embodiment, the data readers may each include an imager designed to obtain images of the item 20 and to communicate those images to the decoding unit (which may be part of the processor) in an external database for decoding the coded information captured in the images and identify the item 20.

The data readers 50, 52 may include any suitable decoding algorithms to decode coded information from the item 20 that may be contained within one-dimensional codes, two-dimensional codes, stacked codes, or other code configurations. In this disclosure, the data readers 50, 52 may be referenced as including imagers or imaging systems, but it should be understood that the reference is meant to provide an example configuration for the data readers. Other data reading systems and data reader configurations may be used without departing from the principles of the disclosed subject matter. Examples of various configurations include those described in any of the following: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Pat. No. 10,970,502, issued Apr. 6, 2021, and entitled "DATA COLLECTION SYSTEMS AND METHODS TO CAPTURE IMAGES OF AND DECODE INFORMATION FROM MACHINE-READABLE SYMBOLS," and U.S. Patent Application Publication No. 2023/0206205, filed Nov. 29, 2022, and entitled "FIXED RETAIL SCANNER WITH MULTI-PORT NETWORK SWITCH AND RELATED METHODS, the disclosure of each of which is incorporated by reference herein in its entirety.

With reference to FIG. 1, the following provides an example operation of the data reading system 10 in accordance with one embodiment. During a transaction, the item 20 is moved along the direction of motion 22 across the platter 42 above the horizontal scan window 46 and in front of the vertical scan window 48. As the item 20 is moved across the scan windows 46, 48, the data readers 50, 52 cooperate to obtain image data for all sides of the item 20 to find and decode the optical code. For example, if the optical code (or other target data) is present on the bonnet side surface 36 of the item 20, the data reader 52 reading through the vertical window 48 of the bonnet 44 will capture the optical code in an image of the side surface 36 for decoding. Similarly, if the optical code is on the bottom surface 28 of the item 20, then the data reader 50 reading through the horizontal window 46 may capture the optical code in an image for decoding. Likewise, if the optical code is on any of the remaining surfaces of the item 20, one or both data readers 50, 52 (either individually or in combination) may capture image views bearing the optical code on the item 20 for decoding. For items 20 sold by weight, the item 20 is positioned on the platter 42 for weighing via the scale 164.

If the optical code is positively captured and decoded or if the item weight is accurately obtained, the data reading system 10 may emit a beeping (or other) sound indicating that the item 20 has been processed, and the customer 38 may proceed to the next item 20. Alternatively, the data reading system 10 may emit a different beeping (or other) sound indicating that the item 20 was not properly processed and present a message requesting that the customer 38 reprocess the item 20. Other feedback methods may also be provided, such as visual feedback (e.g., via an LED or an electronic display), indicating a successful read or an unsuccessful read.

As illustrated in FIG. 1, the data reading system 10 may include a display 54 operable to display information, such as a running transaction list of the items 20 purchased, images, selectable icons, text, or other suitable information to facilitate the transaction. In some embodiments, the display 54 may show an image of a purchased item captured by the data readers 50, 52 or other cameras internal to the data reader housing), a list of purchase items and running costs, the weight of an item and the cost per pound of the item, or other suitable transaction information associated with the items 20. In some embodiments, the display 54 may be a touch screen that allows the customer 38 to interact directly with the screen (or via a stylus or other suitable instrument) to enter information and respond to prompts to allow the customer 38 to manage the transaction. The touch screen may be any of several suitable display types, such as an integrated liquid crystal (LCD) display, an organic light-emitting diode (OLED) display, or other display with suitable touch screen capabilities for detecting the customer's touch via a finger, stylus, or other suitable input device.

Figure 2:
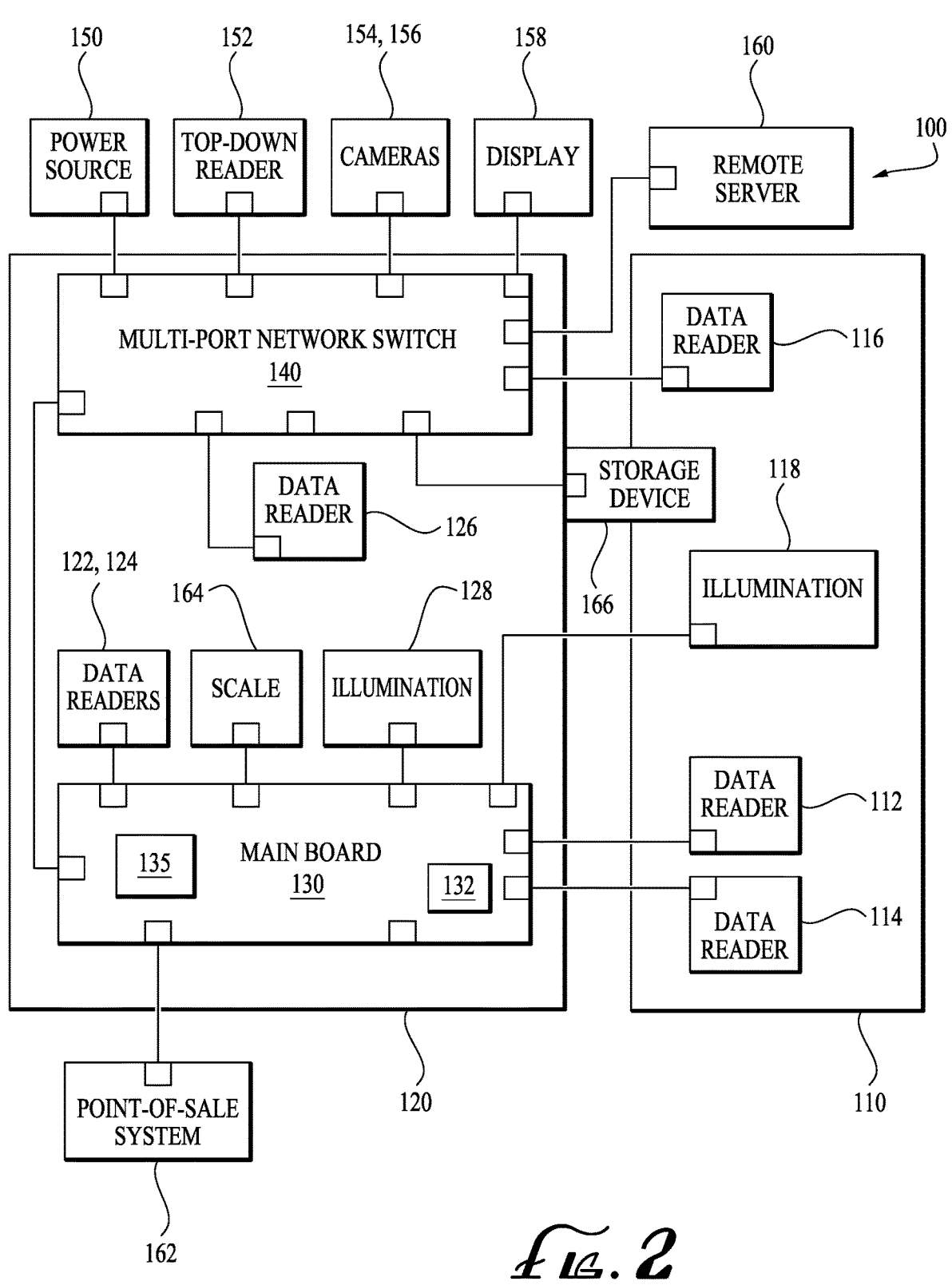
FIG. 2 is a simplified block diagram illustrating components of a data reading system in accordance with one embodiment.

FIG. 2 is a simplified block diagram of a data reading system 100 according to an embodiment of the disclosure. As illustrated in FIG. 2, the data reading system 100 may be operably coupled with one or more of a power source 150, a top-down reader (TDR) 152, peripheral cameras 154, 156, a display 158, a remote server 160, and/or a point of sale (POS) system 162. Additional details of the data reading system 100 are described below.

With reference to FIG. 2, the data reading system 100 may be a bi-optic data reader having a vertical housing 110 and a horizontal housing 120 (arranged in a similar fashion as the data reader 10 of FIG. 1) in some embodiments. The data reading system 100 may be installed in a retail environment (e.g., grocery store), which typically is disposed within a counter or other support structure of an assisted checkout lane or a self-checkout lane. The vertical housing 110 provides an enclosure for one or more data readers 112, 114, 116, active illumination assemblies 118 (e.g., LED assemblies), and other optical elements (e.g., lenses, mirrors, etc.) and electrical elements (e.g., cables, circuit boards, etc.) therein. Similarly, the horizontal housing 120 provides an enclosure for one or more data readers 122, 124, 126, active illumination elements 128 (e.g., LED assemblies), a scale 164, and other optical elements (e.g., lenses, mirrors, etc.) and electrical elements (e.g., cables, circuit boards, etc.) therein. Bi-optic data readers tend to have a larger horizontal housing 120 as compared to the vertical housing 110, which provides space to support various components of the data reading system 100 and the scale 164 used to weigh produce or other items sold by weight or otherwise perform weighing of items when placed on the horizontal surface (often called a "weigh platter").

In some embodiments, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field of view may be physically located within the vertical structure and vice versa.

In one embodiment, the data reading system 100 may include one or more different types of data readers, such as monochrome imagers and/or color imagers. For example, in one embodiment, data readers 112, 114 in vertical housing 110 may be monochrome imagers configured to capture monochrome images through the vertical window (e.g., window 48 of FIG. 1) of the data reading system 100. Likewise, data readers 122, 124 in horizontal housing 120 may be monochrome imagers configured to capture monochrome images through the horizontal window of the data reading system 100. Data reader 116 in vertical housing 110 may be a color camera module configured to capture color images through the vertical window of the data reading system 100. Likewise, data reader 126 in horizontal housing 120 may be a color camera module configured to capture color images through the horizontal window of the data reading system 100. Similarly, peripheral cameras 154, 156 may be either monochrome imagers and/or color imagers. In such embodiments, monochrome images may be analyzed (e.g., by a decoder) to decode one or more indicia (e.g., 1D barcodes, 2D barcodes, optical character recognition, digital watermarks, etc.), and color images may be analyzed (e.g., by an image processor) where color information may be particularly advantageous, such as produce recognition, item recognition or verification, and security analysis. Such analysis may be performed by local and/or remote processors that may contain an artificial intelligence (AI) engine or otherwise configured to perform other machine learning techniques.

The data reading system 100 may further include a main board 130 and a multi-port network switch 140. As shown herein, the main board 130 and the multi-port network switch 140 may be disposed within the horizontal housing 120 in one embodiment. It is contemplated that other embodiments may instead include the main board 130 and/or the multi-port network switch 140 within the vertical housing 110. In an embodiment where one of the multi-port network switch 140 or the main board 130 is disposed within the vertical housing 110 and the other is disposed within the horizontal housing 120, the two boards may be generally oriented orthogonal to each other similar to the orientation of the windows or another angled relationship (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the data readers 112, 114 and the data readers 122, 124, such as via a communication interface (e.g., a MIPI interface) or other suitable interface. The main board 130 may have decoding software embedded therein and/or stored within internal memory 132 such that one or more on-board processors 135 may receive monochrome images to perform decoding on the optical indicia and provide the decoding result to a point of sale (POS) system 162 operably coupled thereto to complete a transaction. The one or more on-board processors 135 may also be configured to provide control (e.g., coordination or synchronization) of the various components of the system including camera exposure and timing of active illumination assemblies 118, 128 of the system. In addition, the one or more on-board processors 135 may also manage a boot sequence for initializing the data reading system 100 and for powering and configuring the various components of the data reading system 100 as further discussed with particular reference to FIG. 3. Suitable software and/or executable instructions for managing the boot sequence and other aspects of the data reading system 100 may be stored within internal memory 132 or another suitable location in communication with the processors 135.

Although a single block is shown representing one or more on-board processors 135, it is contemplated that some embodiments may include multiple processing components (e.g., microprocessors, microcontrollers, FPGAs, AI accelerator modules, etc.) configured with suitable instructions and programming to perform different tasks, alone or in combination, including object detection, system control, diagnostic and performance monitoring, optical code decoding, optical character recognition, artificial intelligence, machine learning analysis, and/or image processing techniques to support the functionality of the data reading system 100.

In one embodiment, the multi-port network switch 140 may be operably coupled to data reader 116, data reader 126, and with main board 130 located within the data reading system 100. Multi-port network switch 140 may also be operably coupled to the power source 150 as well as peripheral devices such as the top-down data reader (TDR) 152, peripheral cameras 154, 156, display 158, the remote server 160, and/or a removable storage device 166. The number and types of peripheral devices may depend on a desired application within a retail environment. The TDR 152 may be configured as a stand connected to the data reading system 100 that typically provides a generally close overhead (angled) view of the read-zone to provide a top view of a product whereas internal data readers 112, 114, 116, 122, 124, 126 may be better suited for capturing images of the bottom and/or sides of the object within the read-zone. Additional TDRs are also contemplated as being connected to the data reading system 100. In some embodiments, peripheral cameras 154, 156 may be located remotely from the housing of the data reading system 100 such as being mounted on a ceiling or wall of the retail environment to provide additional views of the read-zone or checkout area. Such views may be useful for security analysis of the checkout area such as product verification, object flow, and human movements with the retail establishment. Such analysis may be performed by a remote service or other local devices (e.g., located on or otherwise coupled to the main board 130 or ethernet switch 140). Other peripheral devices may be located near the data reading system 100, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 162 may be coupled directly to the main board 130. Such a connection may be via communication interfaces such as USB, RS-232, or other such interfaces. In some embodiments, the POS 162 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135. The multi-port network switch 140 may include a plurality of ports to provide advanced network connectivity (e.g., Ethernet) between internal devices (e.g., CCMs 116, 126) within the data reading system 100 and external devices (e.g., TDR 152, peripheral camera(s) 154, 156, display 158, remote server 160, etc.) disposed outside the vertical and horizontal housings 110, 120 of the data reading system 100. Thus, the multi-port network switch 140 may provide an Ethernet backbone for the elements within the data reading system 100 as well as for external devices coupled to the data reading system 100 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products or devices configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reading system 100.

Although FIG. 2 shows one block for active illumination assemblies 118, 128 in each of the vertical and horizontal housings 110, 120, some embodiments may include multiple such assemblies in each of the horizontal and vertical housings 110, 120 to provide for different lighting options at different angles across the read-zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130 such as a control panel or other such device. In yet other embodiments, the illumination assemblies 118, 128 may be coupled to the multi-port network switch 140 which may route triggering controls from the main board 130. TDR 152, one or more of the peripheral cameras 154, 156, and the display 158 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the data readers 112, 114, 116, 122, 124, 126 (including TDR 152 and peripherals cameras 154, 156). Monochrome images may be captured by monochrome data readers 112, 114, 122, 124 and color images may be captured by color data readers 116, 126. Similarly, monochrome and/or color images may be captured by the TDR 152 and/or peripherals cameras 154, 156 depending on their configuration. The multi-port network switch 140 may be configured to coordinate (e.g., synchronize) timing of camera exposure and active illumination (e.g., white illumination) with the color data readers 116, 126 (as controlled by the controller on the main board 130) to occur in an offset manner with the timing of the camera exposure and active illumination (e.g., red illumination) with the monochrome data readers 112, 114, 122, 124.

Image data (e.g., streaming video, image frames, etc.) from the color data readers 116, 126 may be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the color images internally within the data reading system 100 by the one or more processors 135 supported by the main board 130. In some embodiments, barcode decoding may also be performed on the color images internally within the data reading system 100 by the one or more processors 135 supported by the main board 130. Image data from the color data readers 116, 126 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the color images externally to the data reading system 100 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources. In some embodiments, data readers 116, 126 may have their own on-board processors configured to perform image analysis, decoding, and/or other pre-processing of the image data separate from, or in coordination with, processing done on the main board 130 or other remote systems.

Image data from the monochrome data readers 112, 114, 122, 124 may be provided to the main board 130 to the processing/analysis modules located internal to the data reading system 100 such as the one or more processors 135 supported by the main board 130. As such, barcode decoding may also be performed on the color images internally within the data reading system 100 by the one or more processors 135 supported by the main board 130. In some embodiments, image analysis (e.g., AI, machine learning, OCR, object recognition, item validation, produce recognition, analytics, etc.) may be performed on the monochrome images internally within the data reading system 100 by the one or more processors 135 supported by the main board 130. Image data from the monochrome data readers 112, 114, 122, 124 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the monochrome images externally to the data reading system 100 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reading system 100 by the one or more processors 135 supported by the main board 130. In some embodiments, barcode decoding may also be performed on such images internally within the data reading system 100 by the one or more processors 135 supported by the main board 130. Image data from the TDR 152 or other external peripheral cameras 154, 156 may also be routed through the multi-port network switch 140 to external devices, such as the display 158, the remote server 160, point-of-sale system 162, or other similar devices including any network enabled POS systems. As such, image analysis (e.g., AI, machine learning, OCR, object recognition, item validation, produce recognition, analytics, etc.) may be performed on these images externally to the data reading system 100 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (PoE)) to the main board 130 and the data readers 116, 126. Data readers 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

FIG. 3 is a flow chart illustrating a method 300 for streamlining an initialization process of a data reading system (e.g., data reading systems 10, 100) in accordance with one embodiment. For convenience and to avoid repetition, the following discussion proceeds primarily with reference to the data reading systems 10, 100 of FIGS. 1-2, but it should be understood that the method 300 described with reference to FIG. 3 may apply equally to other data reading system configurations that may include additional or fewer components than those described with reference to the data reading systems 10, 100.

As mentioned previously, in a conventional boot sequence for a data reading system, the various system components may be powered on and configured substantially simultaneously. In these conventional system designs, when power is directed to the scale 164, the load cells capture an initial zero weight for calibration purposes. Accordingly, the weight of any item (e.g., item 20 of FIG. 1) present on the platter 42 at startup of the data reading system will be captured as the initial zero weight. Often, the weight is sufficiently small (i.e., less than approximately 0.5 lbs. to 0.6 lbs. or so) such that it is within the weight limit for accurately zeroing the scale 164 via a zeroing button in communication with the scale 165. Accordingly, after startup, the weight on the platter 42 may be removed and the zeroing button engaged to calibrate the scale 164. However, on some occasions, the initial zero weight exceeds the weight limit for the zeroing button to effectively zero the scale 164 such that the data reading system requires a full reset (with the weight removed from the scale 164) to ensure the scale 164 can be properly calibrated.

As described in further detail below with particular reference to method 300 of FIG. 3, the improved data reading system 10, 100 is designed to power on and configure various components of the data reading system 10, 100 in a selected order to ensure the scale 164 can be easily and efficiently calibrated when the data reading system 10, 100 is initially powered on. In particular, the data reading system 10, 100 may initially power on one or more data readers and use image data from the one or more of the data readers to visualize the read region and the platter 42 and to determine whether there are any conditions or anomalies present within the read region that may affect the weight detected by the scale 164 prior to powering up the scale 164. For example, in some embodiments, using image analysis, a condition affecting the weight detected by the scale 164 may be include determining whether there are any items are present on the platter 42. In some embodiments, using image analysis, the image data may also be used to determine whether the platter 42 itself is present within the read region or whether the platter 42 has been removed or is not otherwise positioned properly for operation. As is further described in detail below, the process in method 300 is designed to delay powering on the scale 164 if the determined conditions are not suitable (e.g., if there is an item on the platter 42 and/or if the platter 42 is not in proper position). Power to the scale 164 during the boot sequence may be delayed until the determined conditions are resolved. As noted previously, the method 300 is designed to eliminate the need to reset the data reading system 10, 100 in the event that a heavy item is present on the platter 42 at start up or if the data reading system 10, 100 is not otherwise ready to capture an initial zero weight because of a missing or misaligned platter 42.

With reference to FIG. 3, at step 302, the processor 135, and/or other suitable component(s) of the data reading system 10, 100 that may be in communication with the processor 135, executes a boot sequence that includes powering on and configuring the various components of the data reading system 10, 100 after the data reading system 10, 100 is powered on. The executable instructions for the boot sequence may be accessed via the processor 135 from the system memory 132, from the storage device 166, from the remote server 160, or from any other suitable source. At step 304, as part of the boot sequence, the processor 135 (or other unit in communication therewith) detects, activates, and configures one or more of the data readers (e.g., data readers 50, 52 of FIG. 1, or data readers 112, 114, 116, 122, 124, 126, 152, including TDR 152 and/or peripheral cameras 154, 156, of FIG. 2) to ensure the data readers are operable for capturing images of any items 20 passing through the read region. The processor 135 may also activate any associated illumination sources (e.g., illumination sources 118, 128) operable to support the corresponding data readers and ensure that the respective fields-of-view of the data readers are properly illuminated for capturing image data. As noted previously, the term "data reader" is used herein in an expansive sense and in the examples provided herein encompasses the TDR 152 and the peripheral cameras 154, 156. In other embodiments, the term "data reader" may include other suitable devices. Accordingly, in some embodiments, the processor 135 may also initiate communication with TDR 152 and/or peripheral cameras 154, 156 that may be connected (e.g., wired or wirelessly). Such TDR 152 and/or peripheral cameras 154, 156 may also have fields-of-view that are directed toward the platter 42 to identify whether an item 20 is placed thereon during the boot sequence.

At step 306, the data readers (e.g., any one or more of data readers 50, 52, 112, 114, 116, 122, 124, 126, 152, 154, 156) obtain image data capturing the read region and/or the platter 42. As noted previously, the image data may include monochromatic images, color images, or a combination of both types of images depending on the configuration of the data readers and the data reading system 10, 100. At step 308, once the image(s) of the read region and the platter 42 have been obtained, the processor 135 (and/or other suitable modules in communication therewith) receives and analyzes the image(s) to assess a condition affecting a weight detected by the scale 164. For example, the processor 135 may be configured to determine whether the platter 42 is clear of any items resting thereon that may impact an initial zero weight reading by the scale 164 once the scale 164 is subsequently powered on by the processor 135.

The processor 135 may employ any one of various suitable image analysis techniques configured to determine the presence of any items 20 on the platter 42. In some embodiments, the processor 135 may implement a rudimentary image-analysis technique since it may not be necessary or desirable to identify the item in the image(s), but merely to determine whether an item is present on the platter 42. For example, the processor 135 may simply compare the real-time acquired image(s) of the platter 42 to a reference image(s) of an empty platter 42 that may be stored in system memory 132, remote server 160, storage device 166, or other suitable location to determine whether the real-time acquired image(s) include any items 20 on the platter 42. In other embodiments, the processor 135 may instead incorporate more rigorous image analysis algorithms, such as SIFT (Scale-Invariant Feature Transform) or SURF (Speeded Up Robust Features) methods, designed both to detect the presence of an item on the platter 42 and to thereafter identify the item as further described with reference to steps 322-326 below.

In other embodiments, the condition or anomaly associated with the read region may include a missing or misaligned platter 42, and the processor 135 may be configured to analyze the image(s) to determine whether the platter 42 has been removed or is otherwise not in a proper position relative to the lower base section 40 (see FIG. 1) or the horizontal housing 120 (see FIG. 2) to assess whether the data reading system 10, 100 is ready for operation. For example, in some embodiments, the processor 135 may compare the real-time acquired image(s) of the read region with a reference image of a data reading system 10, 100 with a platter 42 in position at the read region as described with reference to FIG. 1 to evaluate whether the platter 42 is in position.

If the processor 135 determines that the conditions of the read region and/or the platter 42 are clear (e.g., there is no item detected on the platter 42 and/or the platter 42 is in proper position), decision 310 proceeds along "YES" branch 312. At step 314, the processor 135 powers on and configures the scale 164 to ensure it is ready to capture an initial zero weight as described previously. For clarity, to this point in the boot sequence of the data reading system 10, 100, the scale 164 has not been powered on to avoid capturing a large initial zero weight.

If the processor 135 determines that the conditions of the read region and/or the platter 42 are not clear (e.g., an item is detected and/or the platter 42 is not in position), decision 310 instead proceeds along "NO" branch 316. At step 318, in some embodiments the processor 135 communicates a message to a user regarding the condition(s) associated with the read region and/or the platter 42. The form of communication may take any one of several suitable forms designed to alert the user to the issue. For example, the processor 135 may present the image(s) obtained of the read region showing the item on the platter 42, or may display a suitable error symbol or signal indicating the issue (e.g., flashing light, error code, etc.), and/or transmit a message (via suitable text, audio, or other formats) diagnosing the issue via the display 54, 158 associated with the data reading system 10, 100 and prompt the user to resolve the issue by removing the item(s) from the platter 42 and/or ensuring the platter 42 is in proper position. In other embodiments, the processor 135 may also (or alternatively) emit a beeping or other audible signal via a speaker or otherwise convey a suitable message to prompt the user to address the issue. Any combination of all such messages is also contemplated in embodiments of the disclosure.

At step 320, the processor 135 receives input from the user responsive to the message for resolving the identified condition or anomaly. In some embodiments, the user may input commands via the display 54, 158 (or via another suitable input device) such as by selecting a responsive prompt on the display 54, 158, or by pressing a button associated with the data reading system 10, 100 to register a responsive command, or by using other suitable communication systems or means (e.g., keyboard, stylus, voice commands, etc.) associated with the data reading system 10, 100 to confirm that all issues have been resolved (e.g., the item(s) have been removed from the platter 42 and/or the platter 42 has been properly aligned). In other embodiments, the input may include instruction from the user overriding the issue and instructing the processor 135 to continue with the boot sequence regardless of the item's presence on the platter 42. The user may decide to override the prompt, for example, when the user determines that the item is sufficiently light and the registered weight of the item is one that would fall within the calibration range of the zeroing button associated with the scale 164.

Based on the user input, if the processor 135 determines that the condition(s) of the read region and/or the platter 42 have been resolved (e.g., the user input indicates that the item(s) 20 have been removed, or the user input confirms that the platter 42 is in proper position, or the user input overrides the detected condition(s)), decision 322 proceeds along "YES" branch 324, and the processor 135 continues the boot sequence and activates the scale 164 in a similar fashion as described above with reference 314. In some embodiments, prior to continuing the boot sequence, the processor 135 may repeat steps 306, 308, and 310 to obtain another image or set of images and confirm that the platter 42 is in fact clear and in an operative configuration.

If the processor 135 instead determines that the condition(s) of the read region and/or the platter 42 have not been resolved based on the user input, decision 322 proceeds along "NO" branch 326, and the processor 135 may again communicate the condition(s) to the user in a similar fashion as previously described at step 318, and steps 320, 322 may be repeated to resolve the issue.

In some embodiments, instead of awaiting user input at step 320 before proceeding, the processor 135 may, after step 318, continue obtaining image data from the read region and/or the platter 42 at timed intervals, and as soon as the user resolves the identified condition(s) (e.g., removes the item or properly positions the platter 42), the processor 135 may use image analysis to automatically detect from the image data at the timed intervals that the condition has been resolved (e.g., confirms no item is present on the platter 42 and/or confirms that the platter 42 is in position) without requiring user input. Once the condition has been resolved, the processor 135 may activate the scale 164 in a similar fashion as described above with reference 314.

In some embodiments, the method 300 may include additional steps relating to identifying the item detected on the platter 42 to further streamline the process by allowing the data reading system 10, 100 to potentially bypass the need for requiring feedback from the user depending on the identity of the item. For example, in one embodiment, decision 310 may follow "NO" branch 328 after the processor 135 obtains the image(s) of the item on the platter 42 and determines that the platter 42 is not clear. In this embodiment, at step 330, the processor 135 may use any suitably robust image-analysis techniques (e.g., SIFT, SURF, or other others) to identify the item. For example, the processor 135 may compare the item captured in the image(s) to stock images stored in memory 132, an inventory database (e.g., remote server 160), or other suitable system of the data reading system 10, 100 to identify the item. At step 332, once the item has been identified, the processor 135 determines the approximate weight (or an expected weight range) of the item based on reference information stored for the identified item in an inventory management system or other suitable database.

For example, if the item is identified as a pack of gum from the image data, the processor 135 determines the associated weight for the pack of gum as recorded in the inventory management system. Thereafter, at step 334, the processor 135 compares the item weight of the pack of gum to a threshold weight associated with the calibration range for the zeroing button of the data reading system 10, 100. If the item weight is less than the threshold weight, method 300 proceeds along "NO" branch 336, where the processor 135 may boot the scale 164 as described with reference to step 314 and rely on the user to properly zero the scale 164 via the zeroing button. In some embodiments, the processor 135 may still notify the user that the item is present on the platter 42, but may not require a responsive command to proceed with powering on the scale 164. On the other hand, if the item weight exceeds the threshold weight, method 300 proceeds along "YES" branch 338, where the processor 135 may communicate the condition to the user for handling as described with reference to steps 318-326.

In still other embodiments, if decision 310 indicates that the platter 42 is not clear and ready for operation, the processor 135 may nevertheless determine to proceed with the powering sequence for the scale 164 regardless of the item presence and/or item weight. Thereafter, when the item is removed from the scale 164, the processor 135 may automatically issue and/or execute a re-power command to reset the scale 164 to obtain a new zero weight as needed without requiring user input and without requiring a full reset of the data reading system 10, 100.

As illustrated in FIG. 3, the method 300 provides a streamlined approach for a boot sequence for a data reading system 10, 100. As described, the method 300 is designed to selectively power components of the data reading system 10, 100, and in particular, to delay power to the scale 164 until confirmation is received that the platter 42 is clear of any items on its surface and is otherwise ready for operation. By delaying power to the scale 164, the method 300 avoids the need to reset the data reading system 10, 100 in the event that a heavy item is present on the scale 164 at startup. Moreover, in some embodiments, the method 300 may be designed to identify the item captured on the platter 42 to determine whether power to the scale 164 should be delayed until receiving input from the user or whether the processor 135 may continue with the boot sequence and simply allow the user to recalibrate the scale 164 after the boot sequence is complete and the item is removed.

It should be understood that in other embodiments, certain steps described in method 300 of FIG. 3 may be combined, rearranged, altered, varied, and/or omitted without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system comprising:
   a housing;
   a platter supported on the housing;
   a scale disposed underneath the platter and within the housing, the scale configured to obtain a weight for an item present on the platter;
   one or more data readers, each data reader operable to capture one or more images of the platter; and
   a processor operable to receive the one or more images from each data reader, wherein the processor is configured to:
   determine a condition associated with the platter affecting a weight detected by the scale based on the one or more images; and
   delay power to the scale responsive to the determination of the condition.

2. The data reading system of claim 1, wherein the processor is further configured to determine a presence of an item on the platter based on the one or more images captured by the one or more data readers.

3. The data reading system of claim 2, wherein the processor is further configured to identify the item based on the one or more images and to determine whether to communicate a message in response to determining the condition affecting the weight detected by the scale based at least in part on the identity of the item.

4. The data reading system of claim 2, wherein prior to powering the scale, the processor is further configured to identify the item based on the one or more images and to determine an item weight associated with the item based on stored reference information for the identified item.

5. The data reading system of claim 4, wherein the processor is configured to determine whether to communicate a message in response to determining the condition affecting the weight detected by the scale based at least in part on the item weight associated with the identified item.

6. The data reading system of claim 1, further comprising a display in communication with the processor, the display configured to present a message in response to determining the condition affecting the weight detected by the scale and to receive input responsive to the message.

7. The data reading system of claim 1, wherein the condition includes a presence of an item on the platter, the processor is further configured to:

communicate a message associated with the presence of the item on the platter;

receive input responsive to the message; and power the scale responsive to the input.

8. The data reading system of claim 1, wherein the processor is in communication with the one or more data readers and further configured to:

instruct the one or more data readers to capture one or more images of the platter at multiple time intervals;

analyze the one or more images of the platter captured at each time interval;

detect resolution of the condition based on an analysis of the one or more images captured at each time interval, wherein the resolution is detected by the processor without user input; and power the scale responsive to detecting the resolution of the condition.

9. A method for calibrating a scale of a data reading system, the method comprising:

activating, via a processor, one or more data readers;

capturing, via the one or more data readers, one or more images of a read region of the data reading system;

determining, via the processor, a condition affecting a weight detected by the scale associated with the read region via analysis of the one or more images prior to powering the scale; and delaying, via the processor, powering the scale responsive to determining the condition until after the condition is resolved.

10. The method of claim 9, the method further comprising:

communicating, via the processor, a message in response to determining the condition affecting the weight detected by the scale;

receiving, via the processor, input responsive to the message; and powering, via the processor, the scale responsive to the input indicative of a resolution of the condition.

11. The method of claim 9, wherein the step of determining a condition affecting the weight detected by the scale includes determining whether a platter of the data reading system is absent from or misaligned at the read region.

12. The method of claim 11, wherein the step of determining whether the platter is absent or misaligned further includes comparing the one or more images of the read region as captured via the one or more data readers with one or more stored reference images including a reference platter aligned in position at the read region.

13. The method of claim 9, wherein the data reading system includes a platter at the read region, and wherein the step of determining a condition affecting the weight detected by the scale further includes detecting a presence of an item on the platter.

14. The method of claim 13, wherein the step of detecting the presence of the item further includes comparing, via the processor, the one or more images of the read region as captured via the one or more data readers with one or more stored reference images of the data reading system with an empty reference platter.

15. The method of claim 13, further comprising, identifying, via the processor, the item based on the one or more images captured by the one or more data readers.

16. The method of claim 15, further comprising determining, via the processor, an item weight associated with the item based on stored reference information associated with the item, wherein the step of determining the item weight occurs prior to powering the scale.

17. The method of claim 16, further comprising:

comparing, via the processor, the item weight to a threshold weight;

resolving, via the processor, the condition based at least in part on the item weight being less than the threshold weight; and powering, via the processor, the scale after resolving the condition.

18. The method of claim 15, further comprising determining, via the processor, whether to communicate a message in response to determining the condition affecting the weight detected by the scale based on the identity of the item.

19. The method of claim 9, further comprising:

capturing, via the one or more data readers, one or more images of the read region at multiple time intervals;

analyzing, via the processor, the one or more images captured at each time interval;

detecting, via the processor, resolution of the condition based on an analysis of the one or more images captured at each time interval, wherein the resolution is detected without user input; and powering, via the processor, the scale responsive to detecting the resolution of the condition.

20. The method of claim 9, further comprising:

presenting, via a display, one or more messages associated with resolving the condition affecting the weight detected by the scale; and executing, via the processor, instructions for resolving the condition based on a response received to the one or more messages.

* * * * *